(12) United States Patent
Haynes et al.

(10) Patent No.: US 8,746,649 B2
(45) Date of Patent: Jun. 10, 2014

(54) VARIABLE STIFFNESS SUPPORT

(75) Inventors: David F. Haynes, Arlington, TX (US);
David L. Williams, Colleyville, TX (US); Michael R. Smith, Colleyville, TX (US); Robert J. Pascal, Southlake, TX (US); David E. Heverly, Arlington, TX (US); Taeoh Lee, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 13/545,167

(22) Filed: Jul. 10, 2012

(65) Prior Publication Data

US 2013/0001841 A1 Jan. 3, 2013

Related U.S. Application Data

(60) Continuation-in-part of application No. 12/642,151, filed on Dec. 18, 2009, now Pat. No. 8,215,606, and a division of application No. 10/515,391, filed as application No. PCT/US03/15913 on May 21, 2003, now Pat. No. 7,650,819.

(60) Provisional application No. 60/382,295, filed on May 21, 2002.

(51) Int. Cl.
*F16F 15/04* (2006.01)

(52) U.S. Cl.
USPC .......... 248/635; 464/75; 74/606 R; 74/89.17; 74/411; 74/604; 74/425; 74/443; 267/136

(58) Field of Classification Search
CPC .. B64C 2027/002; B64C 27/001; F16F 1/387

USPC ............ 248/635; 74/606 R, 89.17, 411, 425, 74/443; 700/280; 180/444; 310/51; 381/71.8; 464/75; 267/136; 244/17.13; 701/37; 188/379
See application file for complete search history.

(56) References Cited

U.S. PATENT DOCUMENTS

| | | | | |
|---|---|---|---|---|
| 1,780,727 | A | 11/1930 | Tenney | |
| 4,420,134 | A * | 12/1983 | Flannelly | 248/559 |
| 5,040,764 | A | 8/1991 | Dubois | |
| 5,638,305 | A * | 6/1997 | Kobayashi et al. | 700/280 |
| 5,692,410 | A | 12/1997 | Fenelon | |
| 5,796,849 | A | 8/1998 | Coleman | |
| 6,059,274 | A | 5/2000 | Owen | |
| 6,974,006 | B2 * | 12/2005 | Ruckman et al. | 188/379 |
| 7,013,832 | B2 * | 3/2006 | Sexton et al. | 114/382 |

(Continued)

OTHER PUBLICATIONS

Preliminary Amendment dated Sep. 3, 2009 from U.S. Appl. No. 10/515,391.

(Continued)

*Primary Examiner* — Vinh Luong
(74) *Attorney, Agent, or Firm* — James E. Wilson; Richard G. Eldredge

(57) ABSTRACT

A system and method to control vibrations exerted on a non-vibrating structure. The system includes an adjustable variable stiffness support securely attached to both the non-vibrating structure and a vibrating structure. A driver operably associated with the variable stiffness support is configured to selectively adjust the variable stiffness support. A control system in data communication with both a sensor system and the driver includes an algorithm to determine whether adjustment of the variable stiffness support is required.

5 Claims, 13 Drawing Sheets

(56) References Cited

U.S. PATENT DOCUMENTS

| | | | |
|---|---|---|---|
| 7,398,143 B2 * | 7/2008 | Stothers et al. | 701/37 |
| 8,413,923 B2 * | 4/2013 | Brenner et al. | 244/17.13 |
| 2010/0276853 A1 * | 11/2010 | Visage et al. | 267/140.4 |

OTHER PUBLICATIONS

Publication dated Oct. 13, 2005 from U.S. Appl. No. 10/515,391.
Non Final Office Action dated May 20, 2008 from U.S. Appl. No. 10/515,391.
Response dated Jun. 18, 2008 from U.S. Appl. No. 10/515,391.
Non Final Office Action dated Aug. 21, 2008 from U.S. Appl. No. 10/515,391.
Amendment dated Nov. 19, 2008 from U.S. Appl. No. 10/515,391.
Final Office Action dated Dec. 23, 2008 from U.S. Appl. No. 10/515,391.
Amendment After Final dated Feb. 11, 2009 from U.S. Appl. No. 10/515,391.
Advisory Action dated Feb. 26, 2009 from U.S. Appl. No. 10/515,391.
RCE dated Nov. 13, 2009 from U.S. Appl. No. 10/515,391.
Non Final Office Action dated Apr. 3, 2009 from U.S. Appl. No. 10/515,391.
Amendment dated Jul. 1, 2009 from U.S. Appl. No. 10/515,391.
Notice of Allowance dated Sep. 3, 2009 from U.S. Appl. No. 10/515,391.
Specification dated May 21, 2003 from PCT/US03/15913.
Office Action dated Jun. 12, 2003 from PCT/US03/15913.
Notice of Priority Document dated Jul. 8, 2003 from PCT/US03/15913.
Response dated Aug. 7, 2003 from PCT/US03/15913.
Publication dated Dec. 4, 2003 from PCT/US03/15913.
International Search Report dated Apr. 5, 2004 from PCT/US03/15913.
Written Opinion dated Jul. 29, 2004 from PCT/US03/15913.
Response to Written Opinion dated Aug. 27, 2004 from PCT/US03/15913.
International Preliminary Examination Report dated Jan. 5, 2005 from PCT/US03/15913.
Restriction Requirement dated Dec. 14, 2011 from counterpart U.S. Appl. No. 12/642,151.
Response to Restriction Requirement dated Jan. 11, 2012 from counterpart U.S. Appl. No. 12/642,151.
Interview Summary dated Jan. 6, 2012 from counterpart U.S. Appl. No. 12/642,151.
Non-Final Office Action dated Feb. 13, 2012 from counterpart U.S. Appl. No. 12/642,151.
Amendment dated Feb. 27, 2012 from counterpart U.S. Appl. No. 12/642,151.
Interview Summary dated Feb. 29, 2012 from counterpart U.S. Appl. No. 12/642,151.
Notice of Allowance dated Mar. 7, 2012 from counterpart U.S. Appl. No. 12/642,151.
Issue Notification dated Jun. 20, 2012 from counterpart U.S. Appl. No. 12/642,151.
Canadian Office Action dated Sep. 7, 2012 from counterpart CA Application No. 2,718,642.
Office Action dated Mar. 25, 2009 from CA Application 2,484,843.
Response dated Sep. 18, 2009 from CA Application 2,484,843.
Office Action dated Oct. 17, 2005 from EP 1506353.
Response dated Feb. 2, 2006 from EP 1506353.
Notice for Granting Patent Application dated Apr. 18, 2006 from EP 1506353.
European Patent No. 1506353 dated Aug. 11, 2006.
Non Final Office Action dated May 10, 2007 from CN 100408910.
Non Final Office Action dated Sep. 7, 2007 from CN 100408910.
Notice to Grant Patent Application dated Apr. 3, 2008 from CN 100408910.
Chinese Patent No. 100408910 dated Aug. 6, 2008.

* cited by examiner

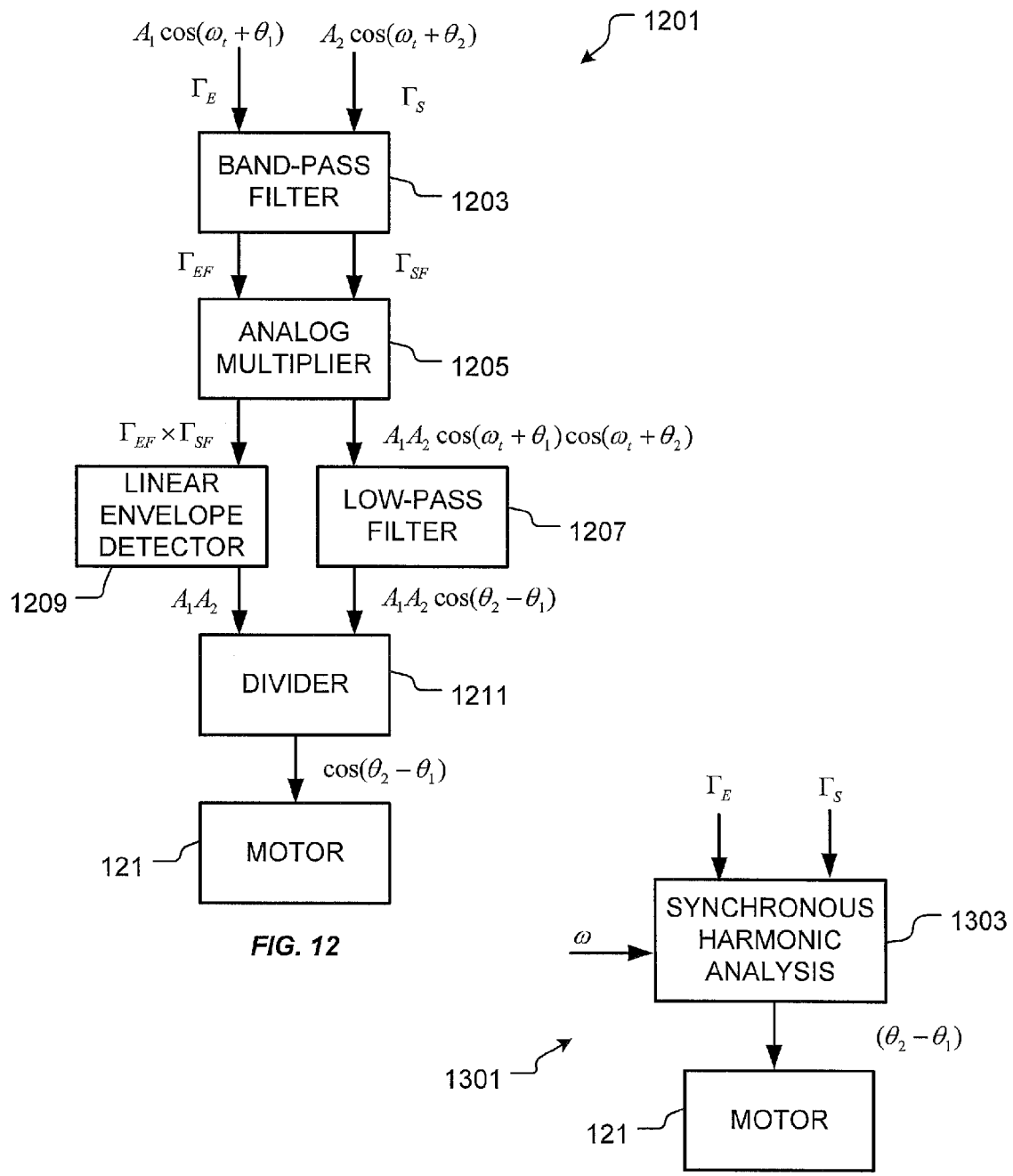

VARIABLE STIFFNESS SUPPORT

CROSS REFERENCE TO RELATED APPLICATIONS

This application is a continuation-in-part of Divisional application Ser. No. 12/642,151, having a filing date of 18 Dec. 2009, titled "Variable Stiffness Support," which is a divisional of U.S. application Ser. No. 10/515,391, having a filing date or 371(c) date of 22 Nov. 2004, titled "Variable Stiffness Support" which was the National Stage of International Application No. PCT/US03/15913, filed on 21 May 2003, titled "Variable Stiffness Support," which claims the benefit of U.S. Provisional Application No. 60/382,295, having a filing date of 21 May 2002, titled "Variable Stiffness Support," all of which are hereby incorporated by reference for all purposes as if fully set forth herein.

BACKGROUND

1. Field of the Invention

The present system and method relates to devices that provide vibration attenuation and isolation at structural joints and attachments.

2. Description of Related Art

Mechanical vibration is a term that describes oscillatory motion resulting from fluctuating forces acting on a dynamic system, that is, a system of mass and elastic elements. In certain situations, these motions can become excessive, causing reduced life, improper function, and possible failure of the system. This is especially important in regard to aircraft, or more specifically, rotorcraft structures, where failure of the structure may result in loss of life or aircraft. Excessive vibration within these structures may also lead to discomfort or sickness of passengers or crew, impairing safe operation of the aircraft. Effective control of vibrations is very important in this and other applications.

Of primary interest is the resonant condition, where masses and elastic members vibrate at or near their natural frequency. Referring to FIGS. 1A and 1B in the drawings, a simple dynamic system 11 where resonance can occur is illustrated schematically and with a plot, respectively. As is shown, a mass 13 is supported by a spring 15 and a damper 19 attached to a moving support 17. The motion of support 17 is oscillatory in the vertical direction. For this system, the natural frequency is simply the frequency at which mass 13 would oscillate if displaced and let go, with support 17 not moving. When support 17 is moving, the resulting motion of mass 13 with respect to support 17 depends upon the amplitude and frequency of the motion of support 17. If the driving frequency of support motion f becomes equal to the system natural frequency fn, resonance occurs, which results in very large motions of mass 13 for systems that are lightly damped. This is typical of many components and structures, and is illustrated on a plot 21 in FIG. 1B, where the maximum motion X of mass 13 with respect to the motion Y of support 17 occurs when f/fn=1.

For dynamic systems in general, a resonant condition is undesirable and potentially destructive, and should be avoided. This can be accomplished by controlling the driving frequency f and/or the natural frequency fn, or by incorporating sufficient damping. For many systems, such as helicopters, the driving frequency f remains almost constant, i.e., rotor at constant RPM, and sufficient damping is hard to implement without additional weight. As a result, avoiding resonance requires controlling the system natural frequency fn, so that the natural frequency fn is never equal to the driving frequency f. This can be done by either changing the mass or the stiffness properties of the system. Because the mass is usually fixed, the only remaining adjustment is the stiffness of the system.

The simple model of FIGS. 1A and 1B can be extended to more complex systems having multiple mass and stiffness elements, such as helicopter or tilt-rotor airframes. For these systems, multiple driving frequencies from the vibrating rotor combined with the distributed mass and stiffness throughout the airframe create a complex problem in vibration control. Historically, this problem has been overcome by isolating the structure from vibrating components, i.e., rotors, pylons, etc., and/or by building the structure very stiff, so that the system natural frequencies remain higher than any driving frequencies in the system. These frequency isolation methods are simple, but cannot be incorporated without adding significant weight to the airframe structure.

Current efforts to extend the state of the art involve the development of dynamically tailored airframe structures that are "adaptive," or able to change their dynamic characteristics as desired. By changing the stiffness properties of the structures, the structures are able to "de-tune" themselves from adverse resonant conditions, allowing less stiff and potentially lighter structures.

In absence of an effective and practical means to change the stiffness of elastic members in dynamic systems, vibration is often controlled by isolating vibrating components. In a broad context, isolation simply means allowing the vibrating components to move independently, as much as possible, in such a way as to minimize transmitted forces to the remaining system. This type of vibration control is commonly done by supporting or connecting the vibrating components with flexible elements. As applied to a helicopter, a common method of achieving this is by supporting the fuselage from the vibrating rotor and pylon using elastomeric supports acting as springs.

A model of a simple helicopter dynamic system 20 is illustrated in FIGS. 2A and 2B in the drawings. As is shown, a rotor/pylon 23 is supported by a spring 25 and a damper 29 attached to a fuselage 27. The frequency response of system 20 is shown in a plot 31 of FIG. 2B. As shown in the far right of plot 31, the relative motion X of fuselage 27 with respect to the motion Y of rotor/pylon 23 becomes small when the natural frequency fn is much smaller than the frequency of motion f of rotor/pylon 23. In this system, the softer the spring 25, the lower the natural frequency fn, and corresponding motion X of fuselage 27. With regard to vibration isolation, any support in such an application should be as soft as possible. However, if spring 25 is too soft, excessive deflections can occur as rotor loads change.

U.S. Pat. No. 4,362,281 issued to Cresap et al. is based upon this principle, and embodies a soft spring support for isolation of the vibrating rotor/pylon during steady flight conditions. To prevent excessive deflections during changing flight conditions and variations in rotor thrust, mechanical stops are incorporated that "bottom out" and limit motion during these transient conditions. Thus, in the Cresap et al. system, the system stiffness changes from relatively soft to effectively very stiff at the limits of pylon motion.

In some dynamic helicopter systems, dynamic components themselves are used as supports between the helicopter rotor/pylon and the fuselage. The dynamic anti-resonant vibration isolator (DAVI) is an example of such an approach. A simple model of DAVI system 41 is illustrated in FIG. 3. In DAVI system 41, a fuselage mass 43 is attached to a rotor/pylon 45 using a spring element 47 in parallel with a weight 49 on a lever 51. The mechanical advantage of weight 49 and lever 51 can be tailored so that when rotor/pylon 45 is oscillating at a particular frequency, the inertial and spring forces acting on fuselage 43 through a lever pivot 53 and spring element 47 are equal and opposite, so that, theoretically, no net forces are acting on the fuselage.

The devices disclosed in U.S. Pat. No. 6,247,684 issued to Manfredotti and U.S. Pat. No. 4,365,771 issued to Halwes are based upon the DAVI principle. Manfredotti discloses a dynamic component intended for use as a support between a helicopter rotor/pylon and fuselage, and Halwes discloses a liquid inertia vibration isolator. In these devices, the net forces acting on the structure are minimized, thereby limiting vibration. These devices, however, are only effective within a narrow frequency band of operation, and may not provide adequate isolation as rotor rpm, flight, or operating conditions change.

The rotary beam variable stiffness wing spar described in U.S. Pat. No. 6,000,660 issued to Griffin et al. discloses a variable stiffness element for use in dynamically tailored airframe structures. In the Griffin et al. device, the wing spar is a non-rectangular beam, having different bending stiffness depending upon the orientation of the beam and loading. When rotated within the wing, the stiffness and dynamic properties of the wing can be varied. The Griffin et al. device is very large and heavy, and difficult or impractical to implement in but a few locations.

Although the foregoing designs represent considerable advancements in the area of vibration isolation and control, many shortcomings remain.

BRIEF DESCRIPTION OF THE DRAWINGS

The novel features believed characteristic of the different embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIGS. 12-15 are flowcharts depicting exemplary embodiments of a control algorithm for a control system of the vibration isolation system of FIG. 11;

Figure 1A:
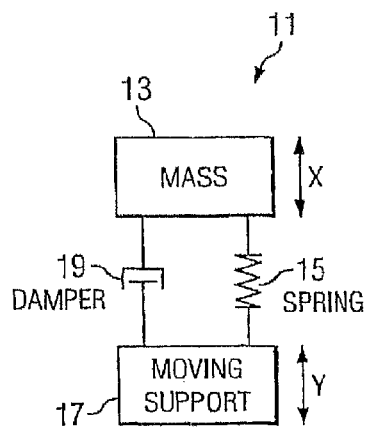
FIG. 1A is a schematic view of a simplified dynamic system.
Figure 1B:
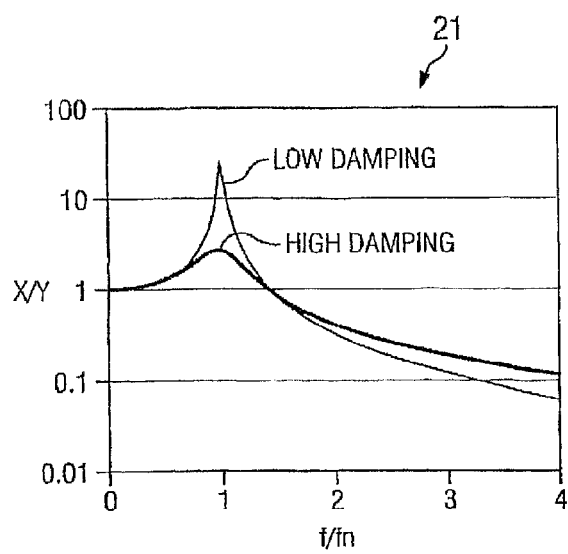
FIG. 1B is a plot of the frequency response of the dynamic system of FIG. 1A.
Figure 2A:
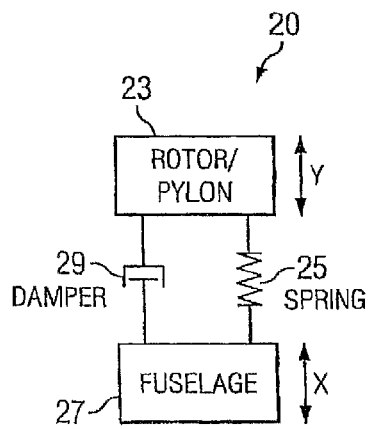
FIG. 2A is a schematic view of a simplified dynamic system for a helicopter.
Figure 2B:
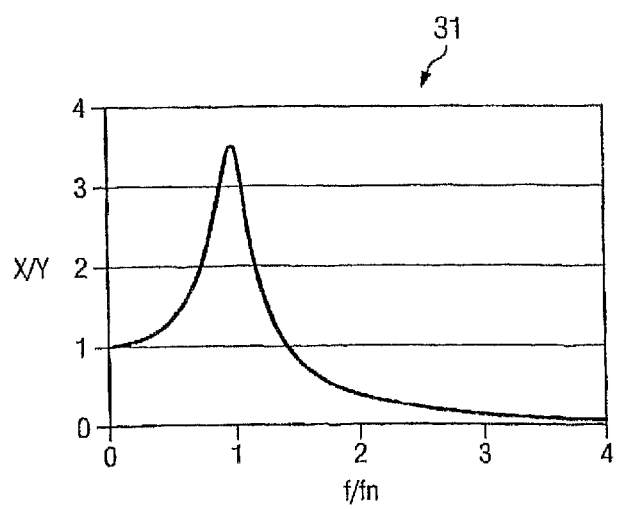
FIG. 2B is a plot of the frequency response of the dynamic system of FIG. 2A.
Figure 3:
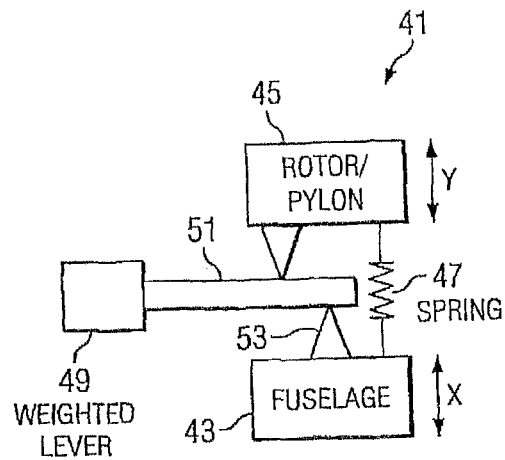
FIG. 3 is a schematic view of a Kaman dynamic anti-resonant vibration isolator.

While the system and method of the present application is susceptible to various modifications and alternative forms, specific embodiments thereof have been shown by way of example in the drawings and are herein described in detail. It should be understood, however, that the description herein of specific embodiments is not intended to limit the system and method to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the system and method are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of the present application overcomes common disadvantages associated with conventional systems, as discussed above. Specifically, in one embodiment the system continuously monitors developments in vibrations created by the vibrating body, e.g., the aircraft airframe, and adjusts the vibration absorber accordingly. To achieve these features, the system is provided with one or more sensors associated with both the vibration absorber and the vibrating structure, wherein the sensors are adapted to sense the vibration and thereafter relay the sensed data to the a control system, which in turn utilizes a control algorithm for analyzing the input data and for determining whether adjustment of the vibration absorber is required. If required, the control system commands a driver to selectively adjust the absorber until a desired reacting force is created. Further detailed description of these features are provided below and illustrated in the accompanying drawings.

The system and method of the present application will be understood, both as to its structure and operation, from the accompanying drawings, taken in conjunction with the accompanying description. Several embodiments of the assembly are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that features, elements, and/or functions of one embodiment may be incorporated into another embodiment as appropriate, unless described otherwise.

Figure 4:
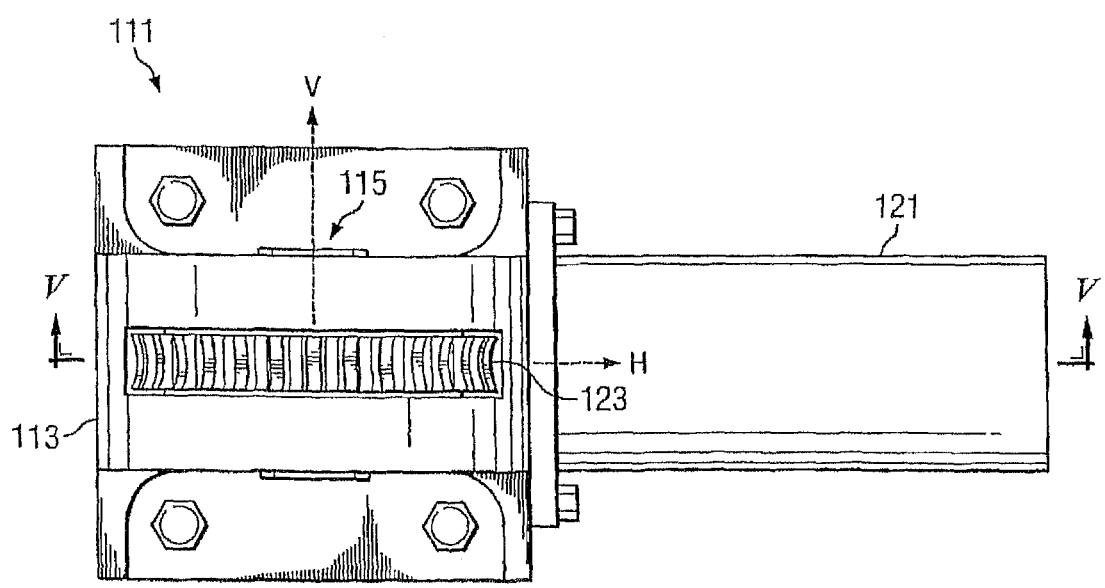
FIG. 4 is a top view of a variable stiffness support according to one preferred embodiment of the present application.
Figure 5:
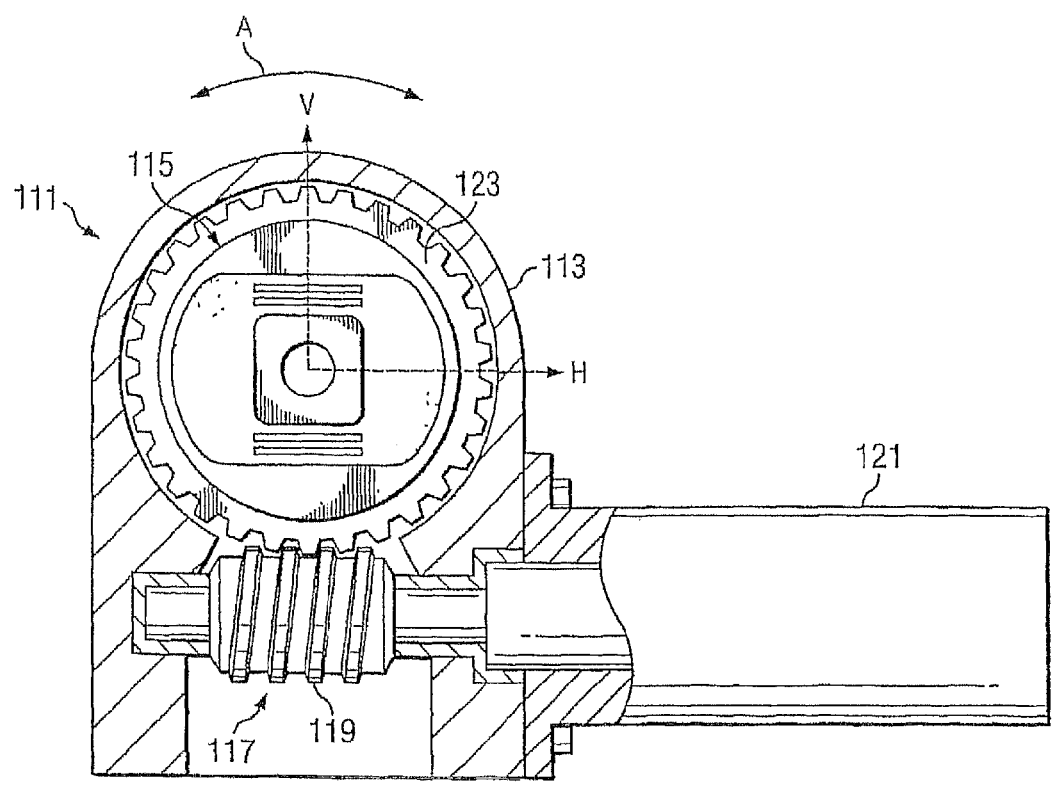
FIG. 5 is a partial cross-sectional view of the variable stiffness support of FIG. 4 taken at V-V.

Referring now to FIGS. 4 and 5 in the drawings, a variable stiffness support 111 is illustrated. Variable stiffness support 111 provides for avoiding resonance by controlling the natural frequency by adjusting the stiffness; thus functioning as a variable stiffness spring. Variable stiffness support 111 is configured in such a way as to provide a different stiffness dependent upon the orientation of the elastomer assembly with respect to the direction of an applied load or deflection. When applied to dynamic systems, the variable stiffness support provides a simple means for changing the system natural frequencies and responses to applied harmonic forces. This allows selective "tuning" of a system away from resonant conditions, where vibrations and forces are high and potentially destructive. As such, variable stiffness support 111 is particularly well suited to provide variable stiffness at structural joints or attachments.

Variable stiffness support 111 includes a support housing 113 that is configured to adjust the angular orientation of an internal elastomer assembly 115. In the preferred embodiment, support housing 113 houses an adjustment mechanism 117 for adjusting the angular orientation of elastomer assembly 115 about a central axis 114 (see FIG. 7) in the direction of arrow A. In the preferred embodiment, adjustment mechanism 117 is a worm gear assembly having a worm 119 driven by a gear motor 121, and an external gear 123 coupled to elastomer assembly 115 that is configured to mate with and be driven by worm 119. Gear motor 121 is configured to controlled and actuated remotely, for example, by a pilot in the cockpit of an aircraft and/or autonomously by a control system.

Figure 6:
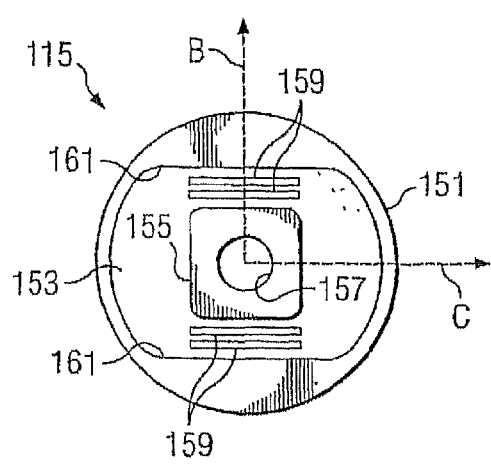
FIG. 6 is a front view of the elastomer assembly of the variable stiffness support of FIG. 4.
Figure 7:
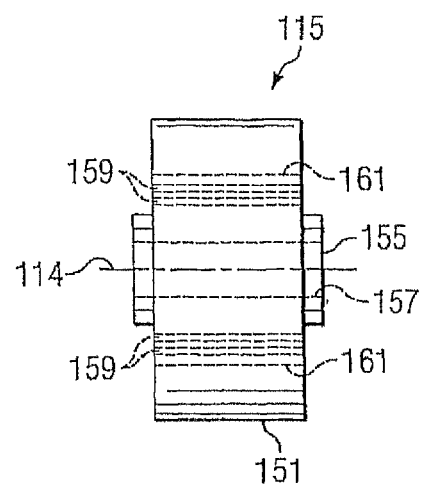
FIG. 7 is a top view of the elastomer assembly of FIG. 6.
Figures 8A, 8B:
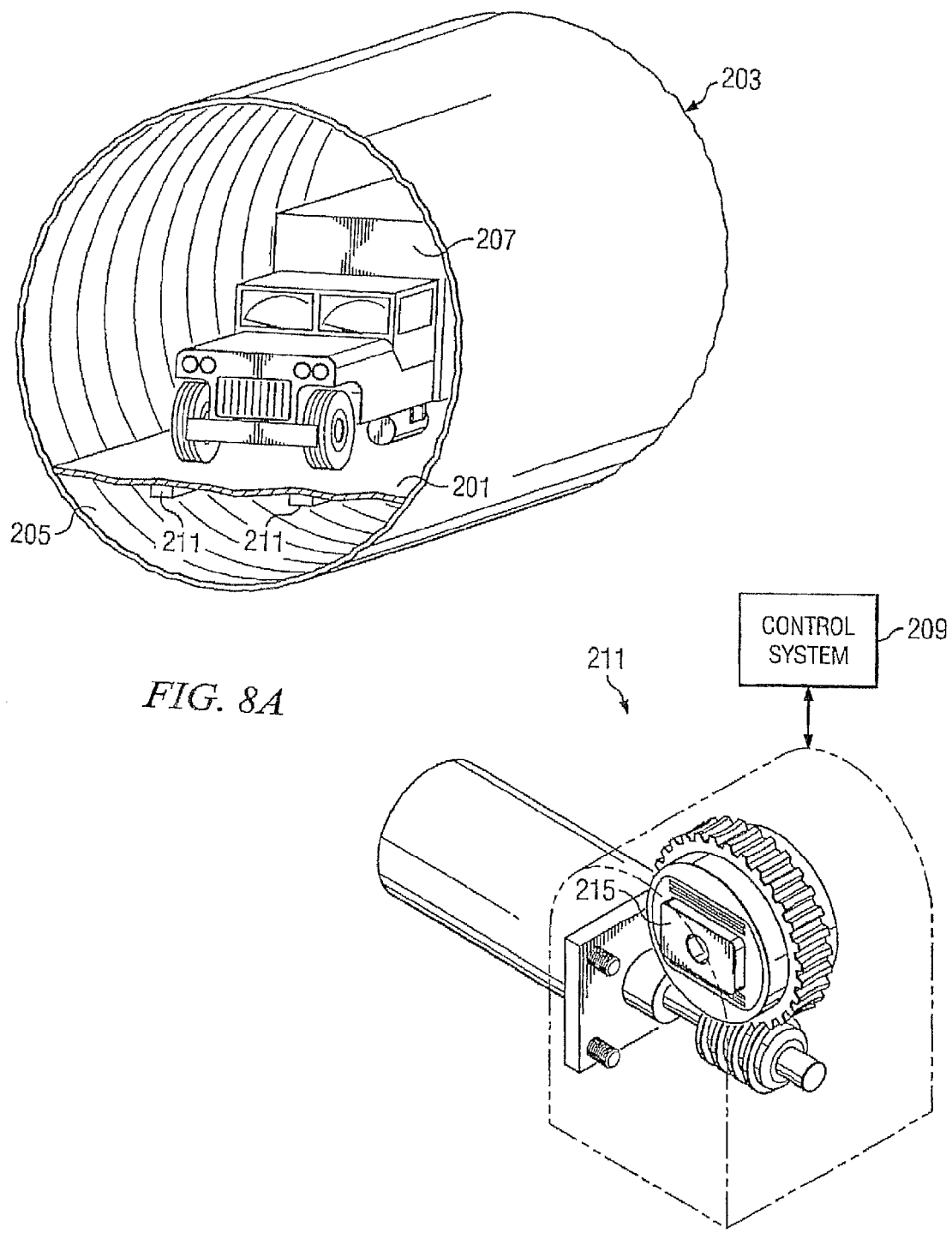
FIG. 8 is a schematic view of an adaptive stiffness floor mount application utilizing a plurality of the variable stiffness supports of FIG. 4.

Referring to FIGS. 6 and 7 in the drawings, elastomer assembly 115 is illustrated. Elastomer assembly 115 includes an outer ring-shaped housing 151 that surrounds an elastomeric material 153. A central bushing 155 having a central aperture 157 is embedded in elastomeric material 153. Bushing 155 preferably has a generally square or rectangular cross-sectional area with the corners rounded off. Bushing 155 may also be elongated with rounded ends as shown in FIG. 8. A plurality of thin rigid shims 159 are embedded in elastomeric material 153 in a parallel planar fashion on both sides of bushing 155. Shims 159 are preferably aligned parallel with opposing sides of bushing 155. In the preferred embodiment, the interior surface of outer ring-shaped housing 151 is annular in shape, except for two opposing internal chord surfaces 161 that are aligned parallel with bushing 155 and shims 159. This parallel stacking configuration of bushing 155, shims 159, and chord surfaces 161 provides for a relatively high stiffness in the direction indicated by arrow B, and a relatively low stiffness in the direction of arrow C.

In operation, forward and reverse actuation of gear motor 121 rotates elastomer assembly 115, thereby changing the orientation of elastomer assembly 115. Changes in the orientation of elastomer assembly 115 changes the stiffness of variable stiffness support in the directions of arrows B and C. Variable stiffness support 111 provides the ability to tailor the stiffness characteristics of dynamic systems or structures.

Referring now to FIG. 8 in the drawings, one application for which variable stiffness support 111 is particularly well suited is illustrated. In this application, a plurality of variable stiffness supports 211 are installed underneath a loaded cargo floor 201 of a cargo bay 203 of an aircraft, forming an adaptive stiffness floor. Variable stiffness supports 211 form an interconnected distributed array that is driven and controlled by a control system 209. Control system 209 and variable stiffness supports 211 provide the ability to selectively change the stiffness between loaded cargo floor 201 and an adjacent fuselage structure 205. A cargo mass 207 is associated with the local variable stiffness to preclude resonance problems. Thus, variable stiffness supports 211 provide the ability to de-tune the airframe from harmful resonant conditions.

Depending upon the orientation of elastomer assemblies 215, significant changes in stiffness may be accomplished, thereby providing a wide range of adjustment for various loading conditions. Because no mechanical stops are used, the stiffnesses of variable stiffness supports 211 are continuously variable over the entire range of adjustment, not just at the limits of certain components.

In one contemplated embodiment, control system 209 may include neural networks or random optimization methods, such as genetic algorithms known as simulated annealing, which is a random optimization method, similar to genetic algorithms; however, unlike genetic algorithms, simulated annealing uses a single solution that "walks" through the design space and "learns" the topology of the objective function. In this manner variable stiffness supports 211 allow for reduced vibration and weight, increased payload and range, and less wear of parts resulting from reduced vibration. It should be understood that this concept of an adaptive stiffness floor may be utilized in a wide range of cargo transport applications, not just cargo aircraft. Alternative algorithms are also contemplated, as will be discussed in detail.

Figure 9:
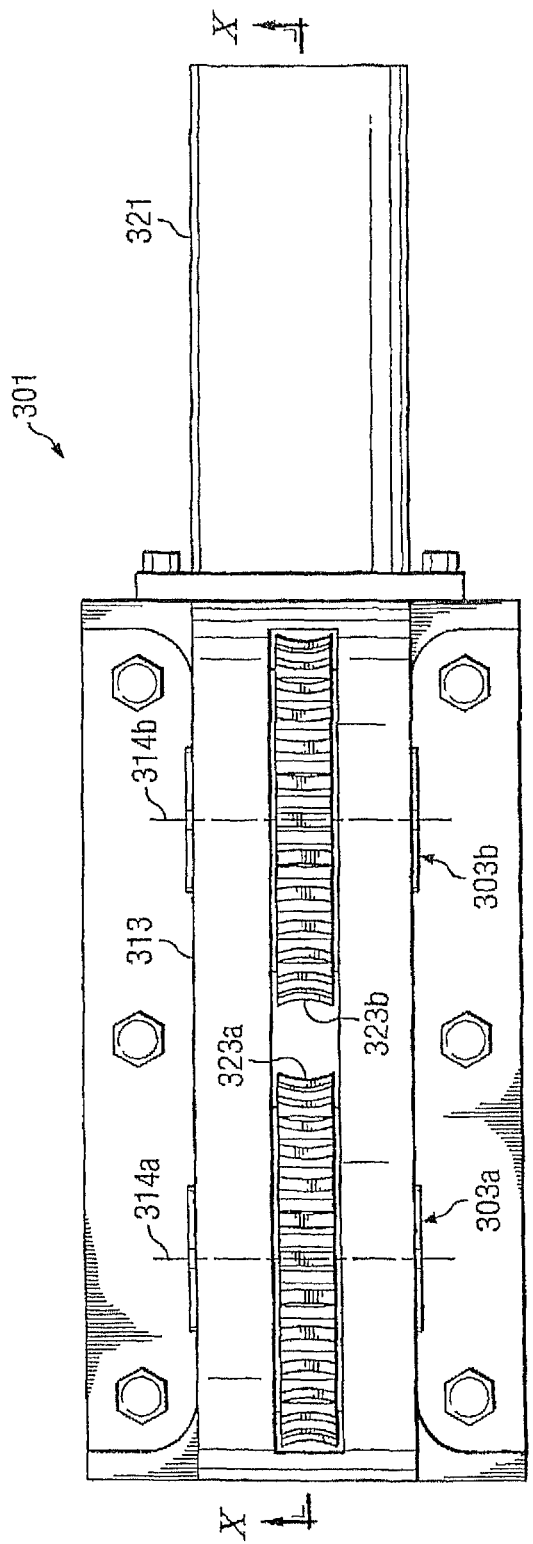
FIG. 9 is a top view of an alternate embodiment of the variable stiffness support according to the present application.
Figure 10:
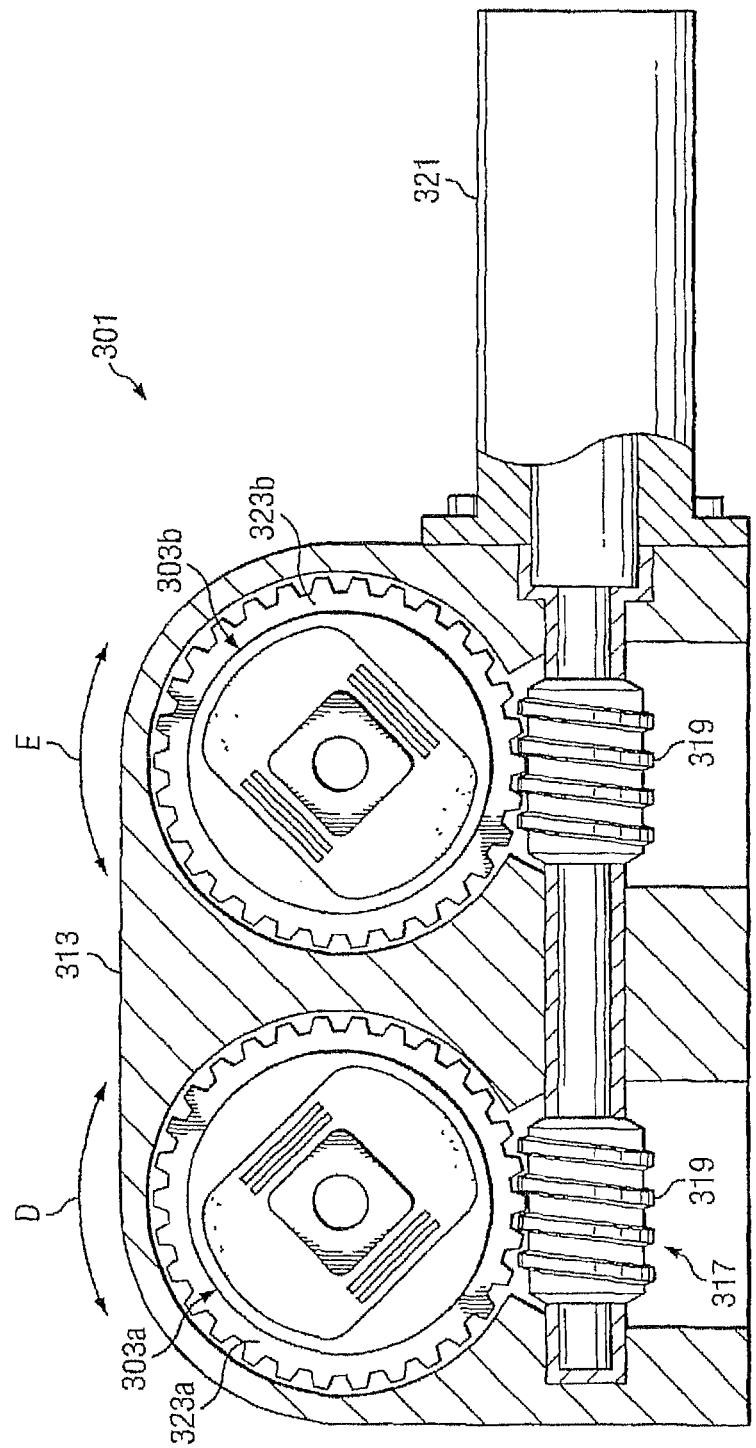
FIG. 10 is a partial cross-sectional view of the variable stiffness support of FIG. 9 taken at X-X.

Referring now to FIGS. 9 and 10 in the drawings, an alternate embodiment of the variable stiffness support is illustrated. It should be understood that this embodiment could include one or more of the features of the embodiments discussed above, and vice-versa. In this embodiment, a variable stiffness support 301 includes two collocated, counter-rotating elastomer assemblies 303a and 303b. Elastomeric assemblies 303a and 303b are preferably identical in form and function as elastomeric assembly 115. Variable stiffness support 301 includes a support housing 313 that is configured to adjust the angular orientation of elastomer assemblies 303a and 303b. In this embodiment, it is preferred that support housing 313 houses an adjustment mechanism 317 for adjusting the angular orientation of elastomer assemblies 303a and 303b about respective central axes 314a and 314b in the directions of arrows D and E.

In the contemplated embodiment, adjustment mechanism 317 is preferably a worm gear assembly having a worm 319 driven by a gear motor 321, and external gears 323a and 323b coupled to elastomer assemblies 303a and 303b, respectively. External gears 323a and 323b are configured to mate with and be simultaneously driven by worm 319. Gear motor 121 is configured to controlled and actuated remotely, for example, by a pilot in the cockpit of an aircraft. It is also preferred that adjustment mechanism 317 be configured such that elastomeric assemblies 303a and 303b counter-rotate, i.e., rotate in opposite directions. It will be appreciated that other contemplated embodiments include different types of driver systems, including a hydraulic driver, piezoelectric, and the like in lieu of the described gear motor and worm gear system.

One advantage to this configuration is that when both elastomer assemblies 303a and 303b are attached to a common point on a supported structure (not shown), lateral loads from each elastomer assembly 303a and 303b are cancelled out locally, and no net later force is introduced into the structure. This occurs when elastomer assemblies 303a and 303b are not oriented purely vertical. Variable stiffness support 301 provides for higher capacity as well.

Figure 11:
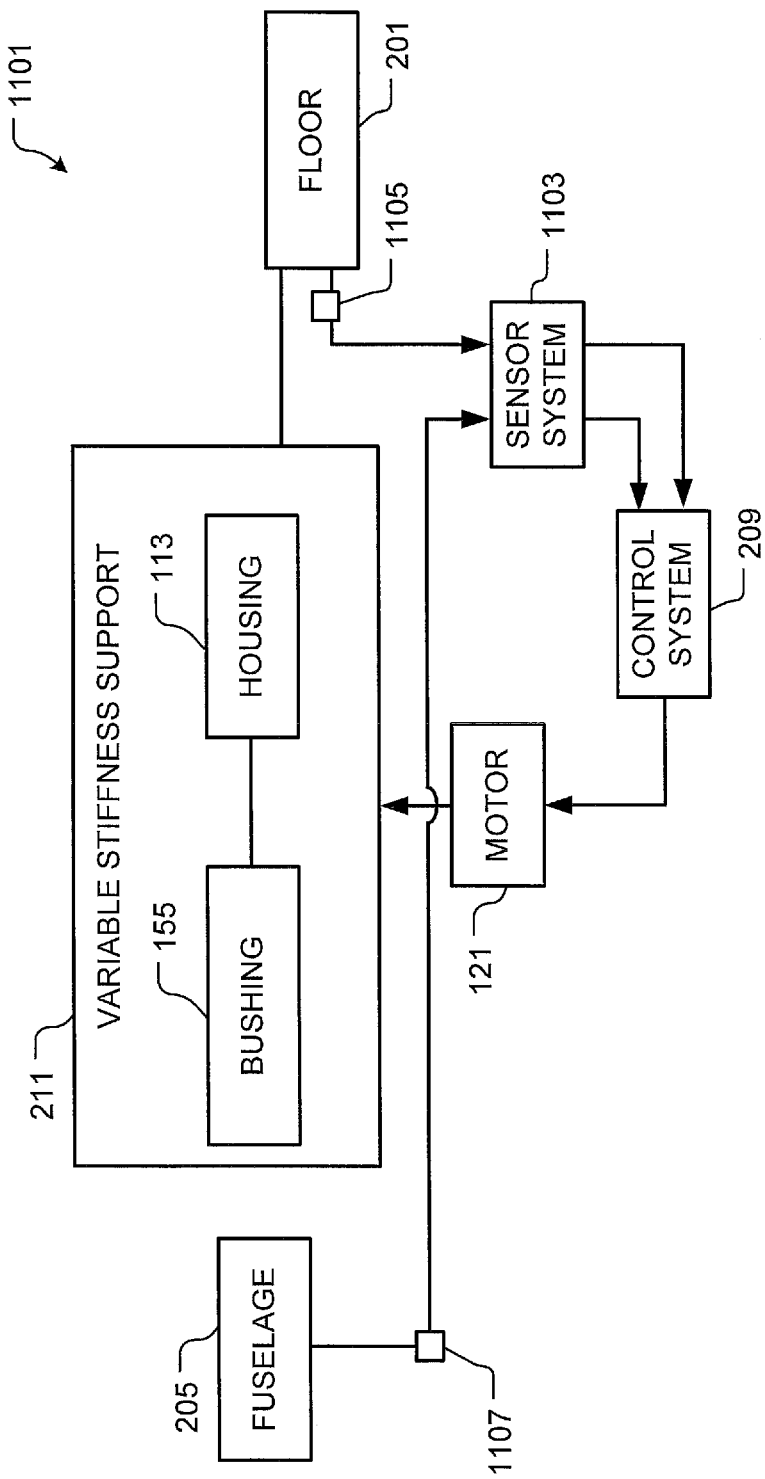
FIG. 11 is a simplified schematic view of a vibration isolation system according to a preferred embodiment of the present application.

Referring now to FIG. 11 in the drawings, a simplified schematic of a vibration isolation system 1101 is shown according to the preferred embodiment of the present application. FIG. 11 illustrates one or more subsystems and devices operably associated with system 1101 and the interaction therebetween, as indicated with arrows. It will be appreciated that system 1101 provides effective means for monitoring and controlling the vibrations created by the vibrating structure, e.g., fuselage structure 205 as discussed above. In the preferred embodiment, system 1101 comprises of a sensor system 1103 for sensing and relaying sensed data to the control system 209, which in turn analyzes the sensed data with one or more control algorithms. Thereafter, control system 209 commands motor 121 to selectively adjust the variable stiffness support 211.

Sensor system 1103 preferably utilizes two sensors operably associated with the vibrating structures on opposing sides of the variable stiffness support. Specifically, a first sensor 1105 is utilized to sense the vibrations from floor 201, while a second sensor 1107 is utilized to sense the vibration response of the fuselage structure 205 on the opposite side of variable stiffness support 211 (for example the adjacent fuselage structure 205 of FIG. 8). The types of sensors contemplated herein are accelerometers; however, the sensor system 1103 could utilize different sensors in alternative embodiments.

It should be appreciated that FIG. 11 also illustrates a control loop, wherein system 1101 continuously monitors changes in vibrations from the vibrating structures, and thereafter responds to these changes by adjusting the variable stiffness support accordingly to minimize the transmission of vibration across the mount.

FIGS. 12-15 depict various schematic views of different control algorithms employed by control system 209. It should be understood that control system 209 utilizes one or more of these types of control algorithms for continuously monitoring changes in vibrations to adjust the variable stiffness support accordingly.

FIG. 12 illustrates an exemplary algorithm 1201 that determines changes in relative phase angles between the two input signals. The process includes receiving and analyzing a first signal from a first sensor 1107 operably associated with the vibrating fuselage, and a second signal from a second sensor 1105 operably associated with the cargo floor. The two signals pass through a band-pass filter 1203, wherein the signals are filtered and then multiplied with an analog multiplier 1205. A voltage proportional to the cosine of the phase shift is obtained using a static low-pass filter 1207 and a linear envelope detector 1209 of the product signal, which then passes through a divider 1211. The output relative phase change between the two signals is compared, and if the relative phase angle is not equal to 180 degrees, then the isolator is adjusted via motor 121 until the relative phase angle approaches 180 degrees. The process is continuously repeated, thus providing real time adjustment of the variable stiffness support.

FIG. 13 illustrates an exemplary control algorithm 1301, wherein the two sensor signals are received and processed through a synchronous harmonic analysis 1303. Specifically, the two signals are utilized in addition to the fundamental frequency of the vibration source w, e.g., the rotational speed of the rotor blades to determine whether adjustment of variable stiffness support 211 is required. Thus, knowing these input values, it is then possible to displace motor 121 having calculated the phase difference between the harmonics of the sensor signals. It should be understood that synchronous harmonic analysis implies that both the rotor speed and rotor azimuth positions are known, which are typically provided by a tachometer signal. Further discussion of these features is provided below with reference to FIG. 15.

Figure 14:
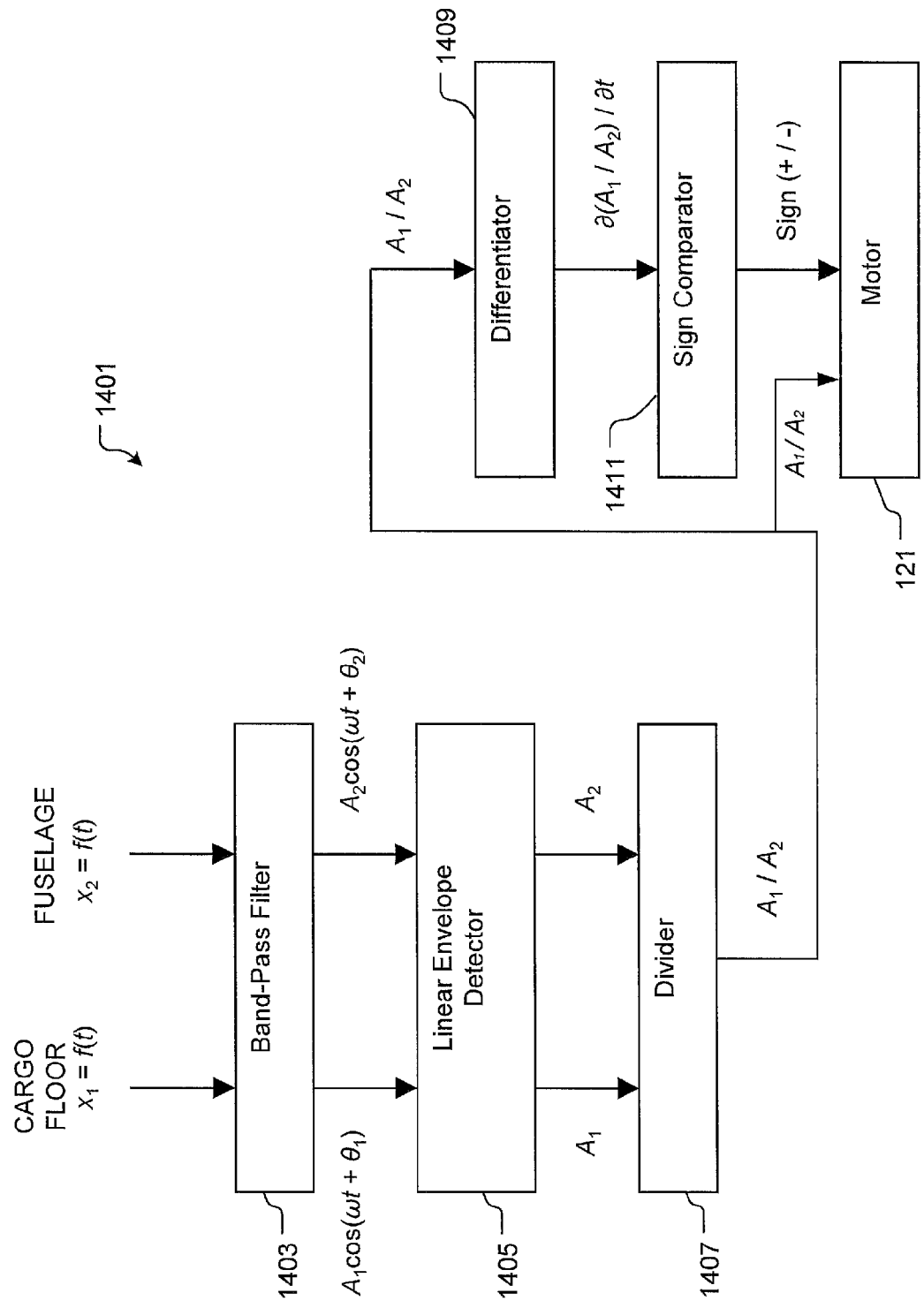

FIG. 14 depicts an exemplary control algorithm 1401 that compares the amplitudes of the two signals for determining whether adjustment of the isolator is required. The two signals pass through a band-pass filter 1403 prior to being analyzed with a linear envelope detector 1405. The amplitudes A1 and A2 of the signals are determined and divided with divider 1407. Thereafter, the ratio of these amplitudes is differentiated with differentiator 1409 to obtain a slope of the signal, which is then compared within a sign comparator 1411. The sign comparator 1411 determines whether the slope is zero, negative, or positive. If the slope is positive or zero, then adjustment of the variable stiffness support is required to avoid resonance. On the other hand, if the slope is negative, the driver adjusts the variable stiffness support accordingly such that the ratio of $A_1/A_2$ is minimized. Further discussion of these features is provided below with reference to FIGS. 16A-C.

Figure 15:
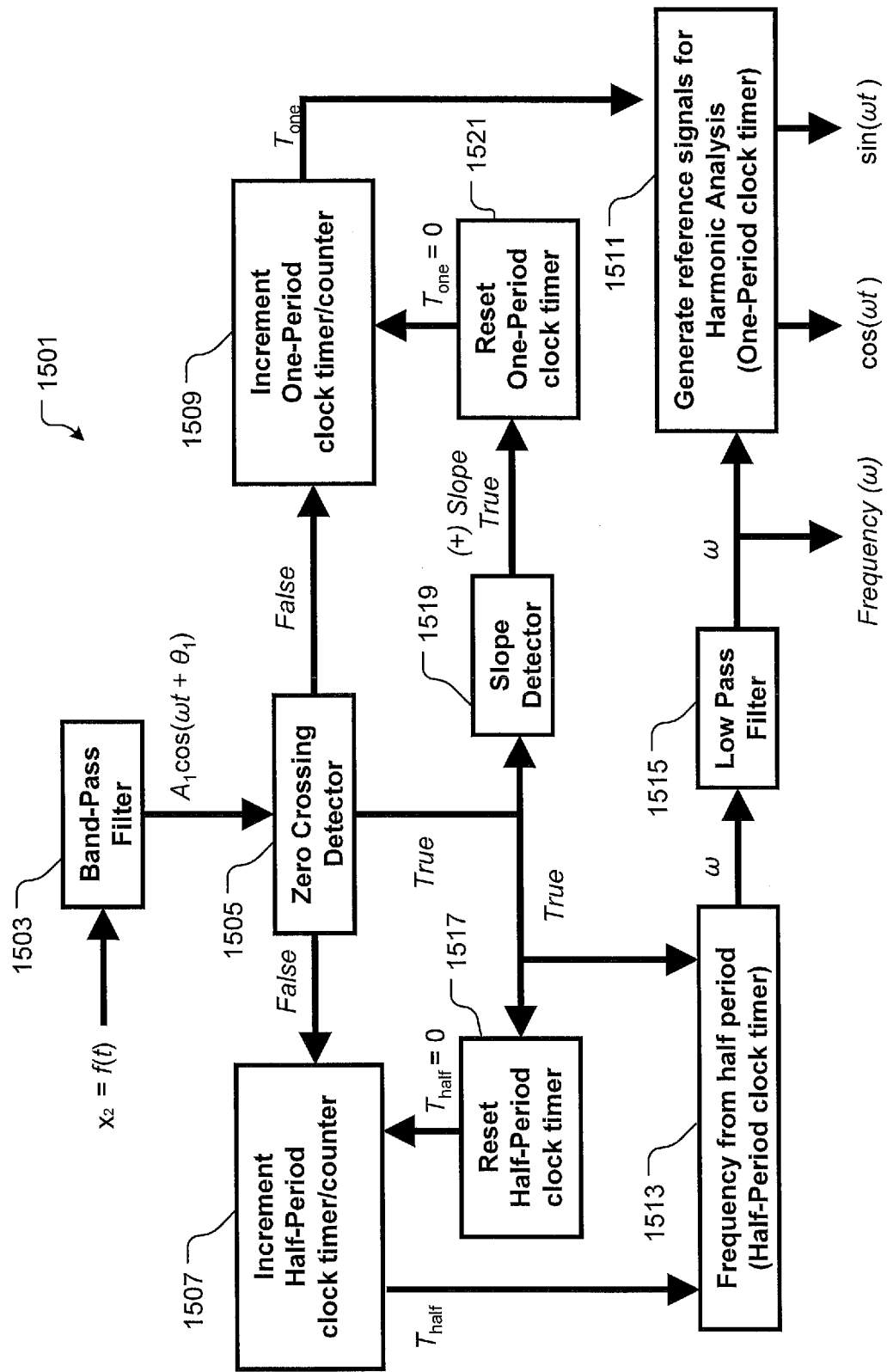

FIG. 15 depicts a schematic view of a control algorithm 1501 for generating the reference signals for algorithm 1301. It will be appreciated that one of the unique features of algorithm 1501 is employing a single sensor, e.g., an accelerometer, for generating the output reference signals. In this process, an input signal, referred to as "x2=f(t)", passes through a band-pass filter 1503, and thereafter determined whether the sinusoidal wave has a zero crossing with a detector 1505. If no zero crossing is found, then the signal is analyzed with a half-period clock timer/counter 1507 and a one-period clock timer/counter 1509 for measuring time increments between zero crossings. It will be appreciated that if the time difference between zero crossings is known, then the frequency of the signal is also known. The incremental one-period time value "T_one" is then relayed to the reference signal generator 1511 and pass onto the harmonic analysis 1301, while the frequency 1513 of incremental half period time value "T_half" passes through a low pass filter 1515 prior to being received by the harmonic analysis 1301.

If the zero detection of the sinusoidal wave is found, then the half-period clock timer resets, as indicated with box 1517. Prior to resetting the one-period clock timer, as indicated in box 1521, the signal waveform passes through a slope detector 1519 that determines whether the slope is positive. The slope detector 1519 detects positive slope values and ignores negative slope values. If the slope is positive, then the one-period clock timer is reset.

Algorithm 1501 provides significant advantageous over convention control processes for determining frequency identification, namely, a single sensor is employed to determine the signal inputs and frequency; whereas, conventional algorithms require a tachometer, or similar means, in addition to an accelerometer to generate the required signals for the harmonic analysis.

Figure 16A:
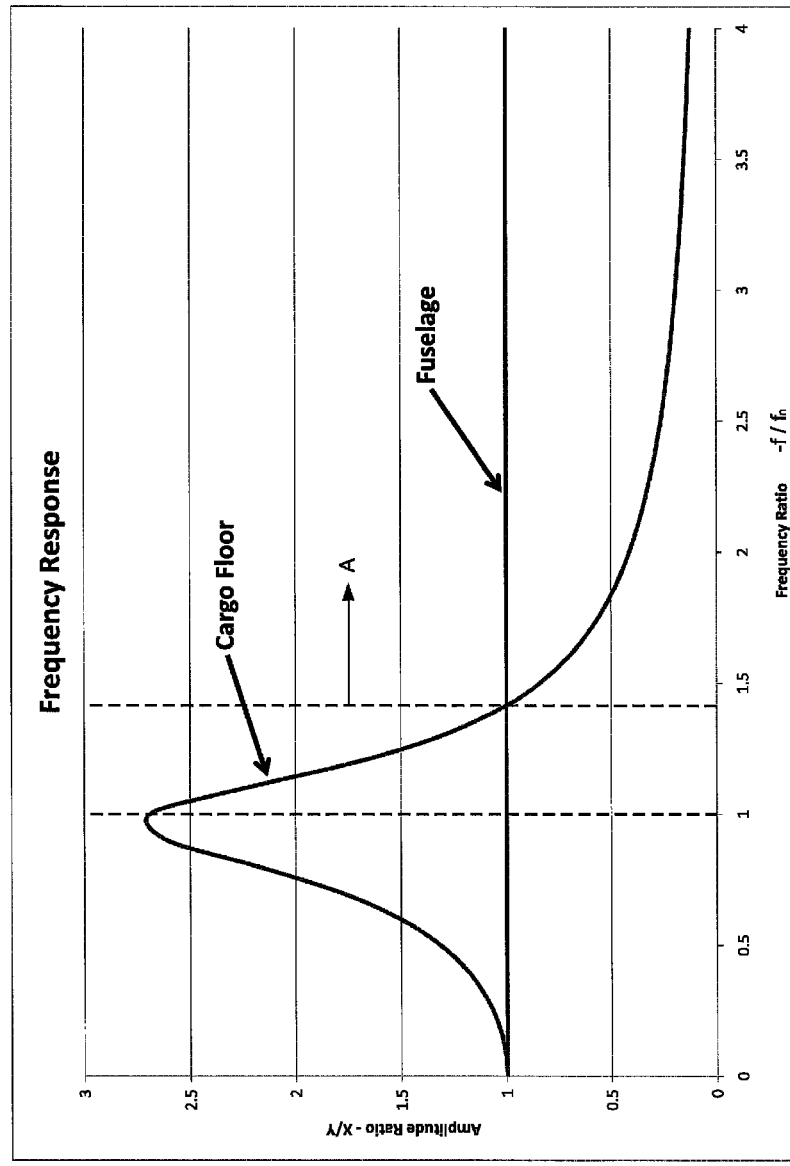
FIGS. 16A and 16B are exemplary plots of a desired tuning response relative to a frequency response of the variable stiffness support.
Figure 16B:
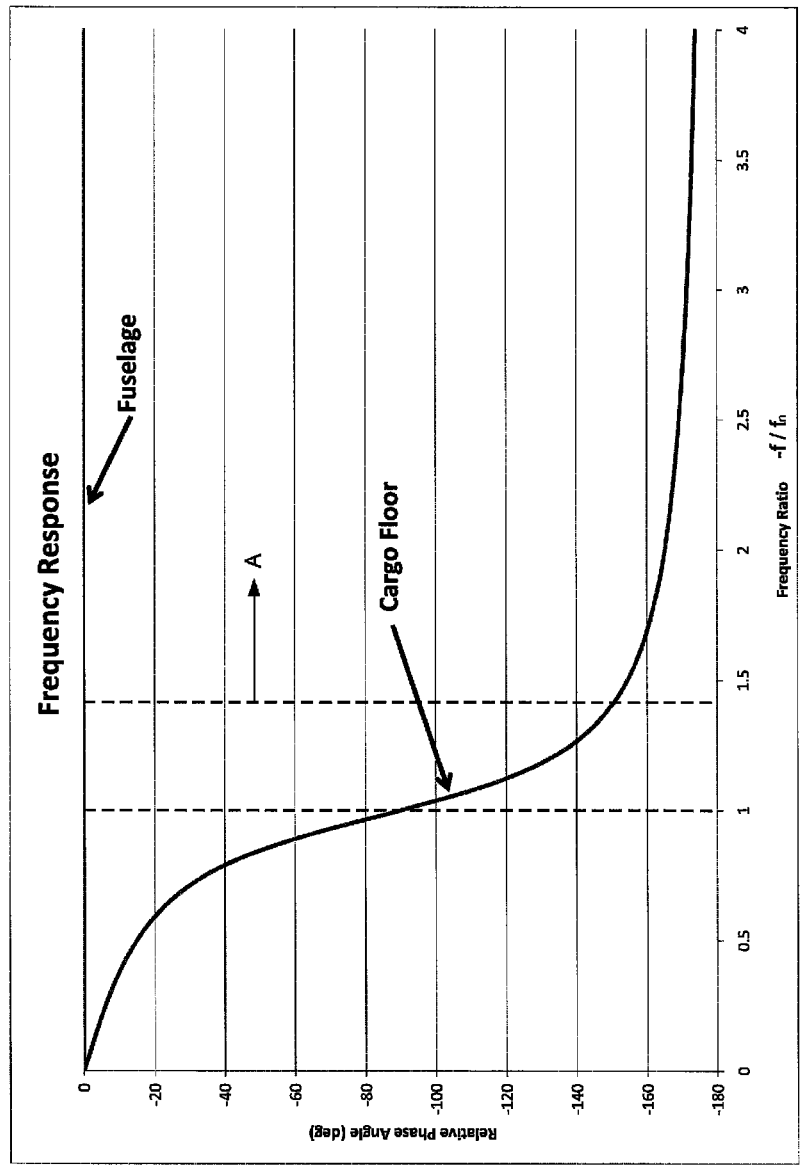

In FIGS. 16A-B, various plots 1601 are shown to depict the frequency response relative to the fundamental excitation frequency. FIG. 16A illustrates the frequency response of the structure on the side of the variable stiffness mount to be isolated, e.g. the cargo floor 201, relative to the vibration response on the opposing side of the mount, e.g the fuselage structure 205. The vertical axis is the ratio of vibration amplitudes on opposing sides of the variable stiffness mount, and the horizontal axis is the ratio of excitation frequency to the natural frequency of the mount and supported structure system. When the excitation frequency equals the mount system natural frequency, the frequency ratio is 1.0, the system is in resonance, vibration is amplified, and the mount stiffness is undesirable. If the mount stiffness is varied such that the system natural frequency is less than 71% of the excitation frequency, e.g. frequency ratio greater than 1.4, then the vibration amplitude ration is less than 1.0 and vibration across the mount is reduced. Thus, the mount stiffness should be varied in the direction of greater frequency ratio, or the direction of arrow A. FIG. 16B illustrates the relative phase relationship between the vibrations on opposing sides of the variable stiffness mount. At resonance, the relative phase angle is 90 degrees, and the relative phase approaches 180 degrees as the vibration amplitude approaches zero.

It should be understood that algorithms 1201, 1301, and 1401 incorporate different methods for determining frequency responses of the vibrating structure. Specifically, algorithm 1201 and 1301 utilize the relative phase angle between the vibrating structure and the isolated structure; whereas, algorithm 1401 utilizes the slope of an amplitude ratio and the magnitude of the amplitude ratio. Both algorithms are utilized to determine whether adjustment of the variable stiffness support is required.

It will be appreciated that a plurality of variable stiffness supports can be utilized together in a system for controlling vibrations. For example, in one contemplated embodiment multiple variable stiffness supports are utilized at spaced distances from each other and operably associated with individual sensors for sensing the vibrations near each spaced region. The sensors communicate with the control system, which in turn can either individually control the vibrations at each region and/or control the vibrations at a global scale, wherein all vibrations detected are considered and one or more of the variable stiffness supports are adjusted accordingly. The control algorithms are taken into consideration with both applications discussed.

Figure 17:
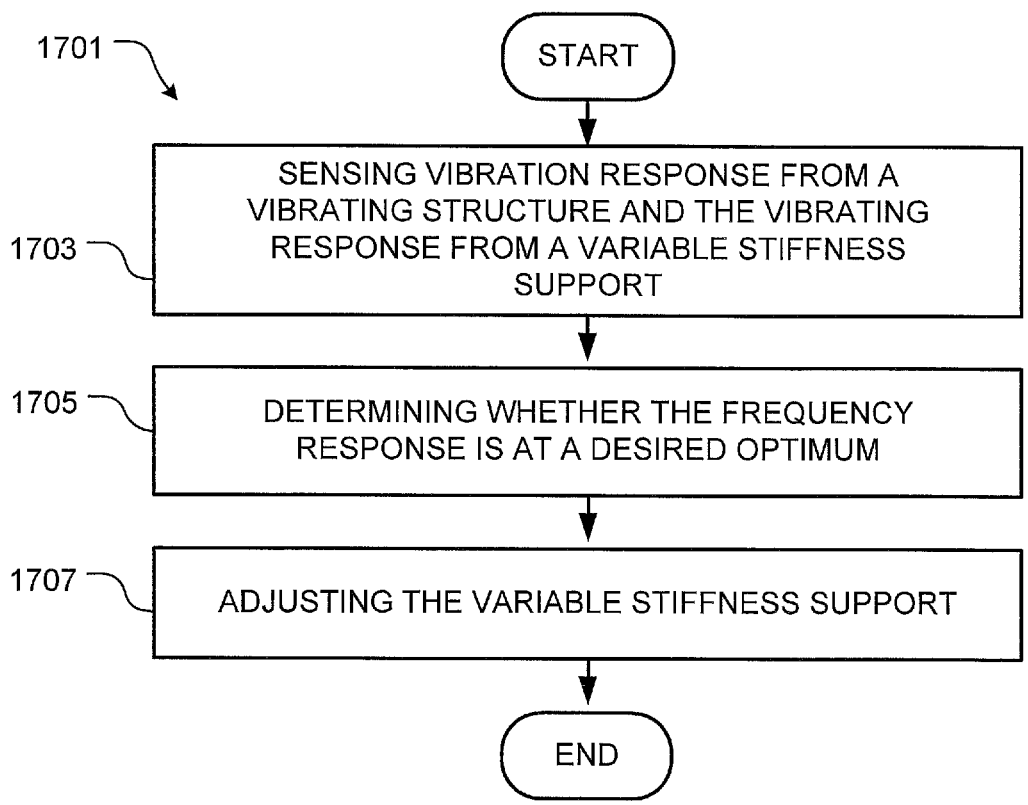
FIG. 17 is a flowchart depicting a preferred method.

FIG. 17 illustrates a flowchart 1701 of the preferred method for vibration control. It is contemplated utilizing the features of system 1101 discussed herein as means for controlling vibrations. Box 1703 illustrates the first step, which includes the process of sensing the vibrations on both sides of the variable stiffness mount. Thereafter, the sensed data is relayed to the control unit and analyzed with one or more control algorithms, as indicated in box 1705. The processes for analyzing the signals are discussed above and hereby incorporated in this preferred method. Finally, if adjustment is required, the control unit commands the driver to adjust the isolator accordingly, as depicted in box 1707. It is contemplated determining the fluctuations of vibrations in a real-time fashion, wherein the system continuously monitors the vibrations and adjusts the isolator accordingly.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

We claim:

1. A floor mounting system, comprising:
    a non-vibrating structure;
    a vibrating structure that exerts a vibratory force on the non-vibrating structure; and
    a vibration isolation system, having:
        an adjustable variable stiffness support securely attached to both the non-vibrating structure and the vibrating structure, the variable stiffness support being configured to isolate the vibratory force exerted on the non-vibrating structure;
        a driver operably associated with the variable stiffness support, the driver being configured to selectively adjust the variable stiffness support;
        a sensor system, having:
            a first sensor associated with the variable stiffness support; and
            a second sensor associated with the vibrating structure; and
        a control system in data communication with both the sensor system and the driver, the control unit being configured to analyze a first output signal from the first sensor and a second output signal from the second sensor and configured to command the driver to adjust the variable stiffness support, the control system having:
            an algorithm, having:
                a linear envelope detector;
                a differentiator; and
                a sign comparator;
            wherein the first signal and the second signal pass through the linear detector for determining a first amplitude of the first signal and a second amplitude of the second signal, then thereafter a slope of a ratio of the first amplitude and the second amplitude is compared with the sign comparator;
            wherein if the slope is not equal to zero, then the variable stiffness support is adjusted accordingly; and
        wherein the vibration isolation system continuously monitors the vibratory forces and adjusts the variable stiffness support accordingly.

2. The floor mounting system of claim 1 the variable stiffness support comprising:
    a housing;
    at least two collocated elastomer assemblies rotatably carried by the housing, each elastomer assembly having a different stiffness in at least two directions; and
    an adjustment mechanism for counter-rotating the elastomer assemblies and adjusting the orientation of the elastomer assemblies relative to the housing.

3. A floor mounting system, comprising:
    a non-vibrating structure;
    a vibrating structure that exerts a vibratory force on the non-vibrating structure; and
    a vibration isolation system, having:
        an adjustable variable stiffness support securely attached to both the non-vibrating structure and the vibrating structure, the variable stiffness support being configured to isolate the vibratory force exerted on the non-vibrating structure, the adjustable variable stiffness support, having:
            an elastomeric assembly carried within a housing, the elastomeric assembly, having:
                an outer ring-shaped housing;
                an elastomeric material disposed within the outer ring-shaped housing;
                a bushing disposed at the center of the elastomeric material; and
                a plurality of shims disposed within the elastomeric material, the shims being aligned parallel with opposing sides of the bushing and
            an adjustment mechanism configured to adjust an orientation of the elastomer assembly within the housing;

a driver operably associated with the variable stiffness support, the driver being configured to selectively adjust the variable stiffness support;

a sensor system, having:
- a first sensor associated with the variable stiffness support; and
- a second sensor associated with the vibrating structure;

a control system in data communication with both the sensor system and the driver, the control unit being configured to analyze a first output signal from the first sensor and a second output signal from the second sensor and configured to command the driver to adjust the variable stiffness support.

4. The floor mounting system of claim 3 the adjustment mechanism comprising:
- a gear motor;
- a worm gear coupled to the gear motor; and
- an external gear matingly coupled to the worm gear, the external gear being coupled to the elastomer assembly;
- wherein actuation of the gear motor causes rotation of the elastomer assembly, thereby changing the stiffness of the elastomer assembly in selected directions.

5. A floor mounting system, comprising:
- a non-vibrating structure;
- a vibrating structure that exerts a vibratory force on the non-vibrating structure; and
- a vibration isolation system, having:
  - an adjustable variable stiffness support securely attached to both the non-vibrating structure and the vibrating structure, the variable stiffness support being configured to isolate the vibratory force exerted on the non-vibrating structure, the variable stiffness support having:
    - a housing;
    - at least two collocated elastomer assemblies rotatably carried by the housing, each elastomer assembly having a different stiffness in at least two directions; and
    - an adjustment mechanism for counter-rotating the elastomer assemblies and adjusting the orientation of the elastomer assemblies relative to the housing;
  - the elastomer assembly, having:
    - an outer ring-shaped housing;
    - an elastomeric material disposed within the outer ring-shaped housing;
    - a bushing disposed at the center of the elastomeric material; and
    - a plurality of shims disposed within the elastomeric material, the shims being aligned parallel with opposing sides of the bushing;
  - a driver operably associated with the variable stiffness support, the driver being configured to selectively adjust the variable stiffness support;
  - a sensor system, having:
    - a first sensor associated with the variable stiffness support; and
    - a second sensor associated with the vibrating structure; and
  - a control system in data communication with both the sensor system and the driver, the control unit being configured to analyze a first output signal from the first sensor and a second output signal from the second sensor and configured to command the driver to adjust the variable stiffness support;
- wherein the vibration isolation system continuously monitors the vibratory forces and adjusts the variable stiffness support accordingly.

* * * * *